US011029835B2

United States Patent
Weiner et al.

(10) Patent No.: US 11,029,835 B2
(45) Date of Patent: Jun. 8, 2021

(54) SYSTEMS AND METHODS FOR DELAYED CONTENT OVERLAY

(71) Applicant: GumGum, Inc., Santa Monica, CA (US)

(72) Inventors: Ken Weiner, Los Angeles, CA (US); Anthony Bruscantini, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 16/401,992

(22) Filed: May 2, 2019

(65) Prior Publication Data
US 2019/0339834 A1 Nov. 7, 2019

Related U.S. Application Data

(60) Provisional application No. 62/667,340, filed on May 4, 2018.

(51) Int. Cl.
G06F 3/0485 (2013.01)
G06Q 30/02 (2012.01)
G06F 40/14 (2020.01)

(52) U.S. Cl.
CPC ............ G06F 3/0485 (2013.01); G06F 40/14 (2020.01); G06Q 30/0277 (2013.01)

(58) Field of Classification Search
CPC ........ G06F 3/0485; G06F 40/14; G06F 3/048; G06F 3/0481; G06G 30/0277
See application file for complete search history.

(56) References Cited

U.S. PATENT DOCUMENTS

| 8,036,990 B1 | 10/2011 | Mir et al. | |
| 2011/0071911 A1* | 3/2011 | Tung | G06Q 30/02 705/14.73 |
| 2011/0082755 A1* | 4/2011 | Itzhak | G06Q 30/02 705/14.69 |

(Continued)

OTHER PUBLICATIONS

MRC Mobile Viewable Ad Impression Measurement Guidelines Final Version p. 1-19 (Year: 2016).*

(Continued)

Primary Examiner — Haoshian Shih
(74) Attorney, Agent, or Firm — Knobbe, Martens, Olson & Bear, LLP

(57) ABSTRACT

Systems and methods are provided for delayed display of supplemental content in association with an underlying page image or other portion of a page. An initial portion of a page may be displayed and associated code may be executed. The code may cause a computing system to perform operations including determining that at least a predetermined minimum percentage of a certain image or other specific portion within the page is visible during display of the page, tracking an amount of time that the minimum percentage of the page image or other content portion remains visible during user interaction with the page, then causing display of overlay content over a portion of the particular image or other portion of the page based on a determination that the amount of time that the minimum percentage of the image or content portion has remained visible exceeds a threshold.

18 Claims, 4 Drawing Sheets

(56) References Cited

U.S. PATENT DOCUMENTS

| | | | |
|---|---|---|---|
| 2013/0305170 A1* | 11/2013 | de Souza | G06F 3/0485 |
| | | | 715/760 |
| 2016/0125453 A1* | 5/2016 | Shukla | G06Q 30/0244 |
| | | | 705/14.45 |
| 2017/0372380 A1* | 12/2017 | Candiotti | G06F 16/90335 |
| 2018/0095707 A1* | 4/2018 | Sato | G06F 3/011 |
| 2018/0300771 A1 | 10/2018 | Roger et al. | |
| 2019/0325485 A1* | 10/2019 | Tully | G06F 16/9535 |
| 2020/0034874 A1* | 1/2020 | Narayan | G06Q 30/0244 |

OTHER PUBLICATIONS

Hiemstra, Siebe, "How to Write a Basic Viewability Tracker", Aug. 23, 2016; available at https://www.themarketingtechnologist.co/how-to-write-a-basic-viewability-tracker/.

* cited by examiner

SYSTEMS AND METHODS FOR DELAYED CONTENT OVERLAY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/667,340 entitled "SYSTEMS AND METHODS FOR DELAYED CONTENT OVERLAY," filed May 4, 2018, which is hereby incorporated by reference in its entirety herein.

BACKGROUND

Publishers of various types of news, editorial or other content often include or incorporate images and videos in their publications. For example, a news article presented in the form of a webpage may include photos or other images within the webpage, in addition to the text of the news article itself. An advertisement may be presented near, on, over or within one or more of these images, such as by overlaying an advertisement graphic and/or advertisement text over a portion of an editorial image or other image on the publisher's webpage. For example, according to existing systems, a rectangular advertisement is sometimes embedded within (or overlaid on top of) a portion of an underlying image. The rectangular advertisement may appear, for example, centered near the bottom of the image, with the majority of the image visible above the advertisement. If a user viewing the webpage or other user interface makes a selection (such as by a mouse click or tap gesture) within the advertisement, the user's browser or other application displaying the webpage or other user interface may load a page associated with the advertisement. This may occur, for example, by the browser sending a network request for content having a uniform resource identifier ("URI") that was previously associated with the selected advertisement.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
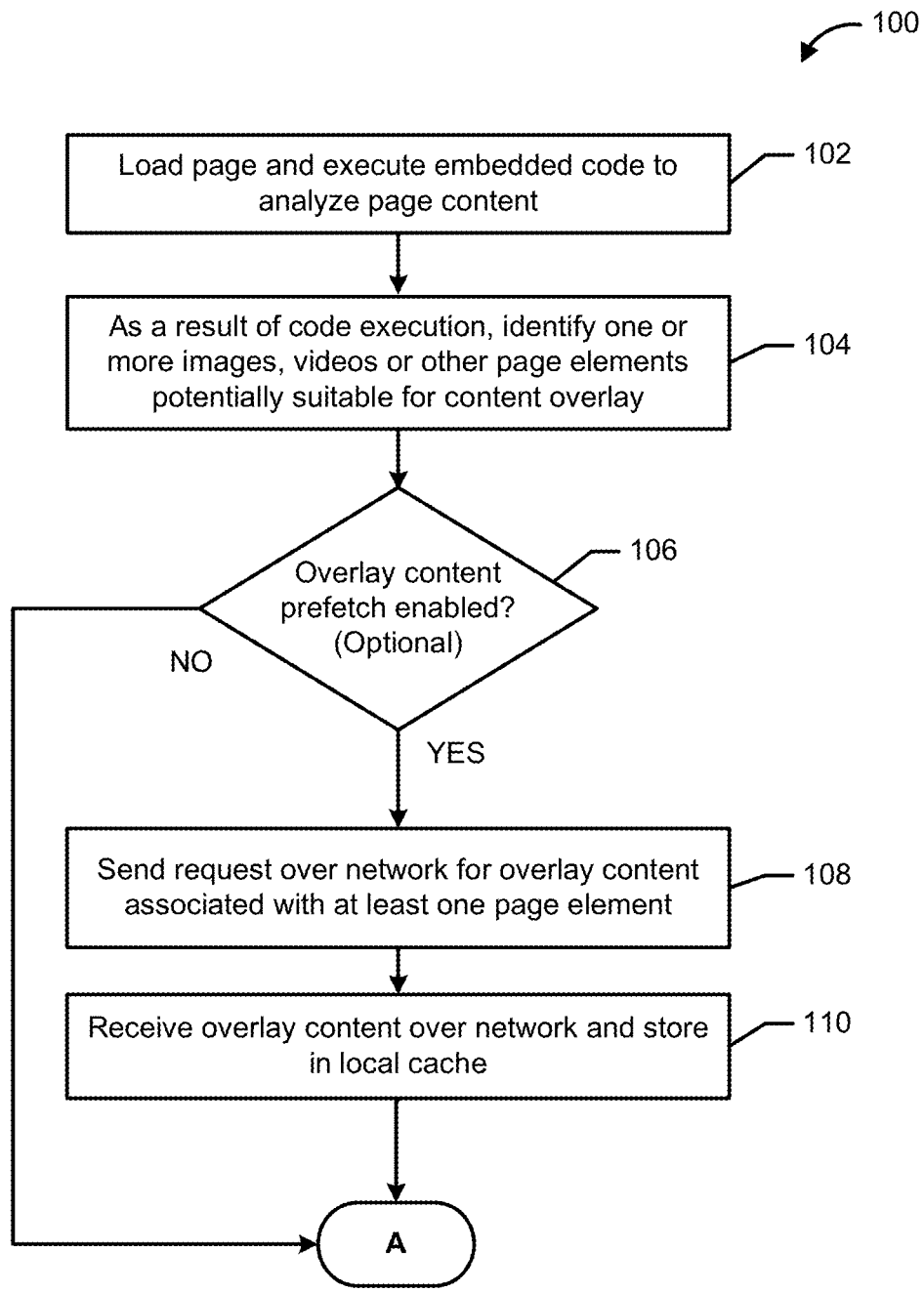
FIGS. 1A and 1B are flow diagrams of an illustrative method for tracking viewability of individual images, videos or other elements within a webpage or user interface as a user browses the page content, and displaying associated overlay content when viewability criteria is met.

Generally described, aspects of the present disclosure relate to advertisement or other supplemental overlay content that is dynamically displayed over or within an image, video or other page element that appears on a webpage or other user interface. Aspects of the present disclosure further include computer-executable code that first causes a computing device to determine whether time-based display criteria has been met with respect to a specific page element prior to augmenting display of the page to include an advertisement or other overlay content over or within the given page element. Accordingly, an advertisement or other overlay content may not be displayed in instances where a user is quickly scrolling through page content, or quickly navigating between pages (e.g., quickly progressing through a slideshow of images or other content).

According to one embodiment, when a page is first loaded for display by a client computing device, such as by a browser application operating on the client computing device, code included within the page (or requested from a server as a result of other code included within the page) may identify images or other elements of the page that may be suitable to have an advertisement presented over or within the image or other element. The code may then cause the client computing device to begin tracking the extent to which each such image or other page element is actually displayed (such as based on both a percentage of the image that is visible, and the amount of time that a certain percentage of the image is in view within a primary browser window). Once one of the suitable images or other page elements meets minimum criteria (such as 100% of the image being in view for more than one second, in one embodiment), the code may cause the display of the page to be updated to include overlay content, such as an advertisement, covering a portion of the given image or element. In other embodiments, additional user interaction data may be considered in determining whether criteria has been met to display the overlay content, such as waiting for a pause in a scrolling action before displaying overlay content, or otherwise pausing or discounting accumulated display time for an element based on scroll behavior or other user activity with respect to the page.

There are various standards and rules known in the art for determining whether an advertisement presented on a webpage should be counted as a viewable impression in a given instance of display on a client computing device. For example, the Media Rating Council (MRC) standard for viewability of ads indicates that ads on a browser page should be counted as viewable ad impressions when the following criteria are met: (1) greater than or equal to 50% of the pixels in the ad were on an in-focus browser tab on the viewable space of a browser page, and (2) the amount of time that the 50% minimum pixel requirement was met was greater than or equal to one continuous second after displaying the ad. According to the MRC standard, satisfying the minimum pixel requirement should precede the measurement of the time duration, such that the timer for determining whether the ad meets the one continuous second time requirement runs only when the ad is determined to be displayed with at least 50% of its pixels in view.

A common approach in prior art systems for displaying ads is for the ad to be presented at the time of an initial page load. Thus, in such approaches, a given in-image advertisement, banner advertisement, or other advertisement may appear from the time that the user first sees the associated image or portion of the page in which the advertisement is incorporated. According to many such prior art methods, the amount of time that a full publisher image (e.g., an underlying image within the page itself) is displayed to the user may equal or be very close (e.g., within tenths or hundredths of a second) to the display time of an in-image advertisement that is overlaid on a portion of that image. In contrast, aspects of the present disclosure utilize a different approach of waiting for an image or other page element to reach a predetermined minimum display time prior to displaying overlay content thereon. A typical developer or system designer familiar with online ad networks and viewability standards for in-image advertisements or other in-page advertisements may find this and other approaches discussed herein to be counterintuitive or undesirable.

As an example of how the delayed display approaches discussed herein may be counterintuitive or not suggested by prior art methods, one may assume that waiting to display an ad until later than is technically needed may in some instances result in an ad network missing out on what would have been a viewable ad impression but-for the code-imposed delay. For example, consider an image (within a webpage) that is on-screen for a total of 1.5 seconds before a user navigates away from the page or scrolls to a new portion of the page that doesn't include the image. In this scenario, an existing method for displaying an in-image ad on the image may result in the ad appearing on the image for the entire 1.5 seconds, which would count as a viewable ad impression under the MRC standards discussed above. In contrast, implementing aspects of the present disclosure may not result in a viewable ad impression for the same image display duration, because the ad may not be shown until the underlying image has first been in view for one second (resulting in a total ad display time of only approximately 0.5 seconds in the scenario of a 1.5 second display of the underlying page image). However, the counterintuitive approaches described herein have other advantages over existing methods, such as by increasing the percentage of displayed ads that end up meeting viewability standards (though not necessarily maximizing the total number of viewable ads, for reasons illustrated in the preceding example).

Aspects of the present disclosure may be particularly useful when implemented with an advertisement or other overlay content that has its display position pegged to an element or portion of the page (e.g., overlay content that moves with the page when a user scrolls), as opposed to overlay content presented on a static position within a browser window (e.g., appearing over the page as a whole to prevent a user from fully viewing the underlying content, or being fixed to a certain display position at the bottom or middle of a display window such that its display position is relatively unaffected by scrolling of the underlying page content). For example, in-image advertisements as described herein typically do not block a publisher's text or other page content (other than a portion of a single underlying image of the page, such as a photograph included in a news article). Thus, delaying display of overlay content described herein is not intended to provide the user with a certain amount of time to view a page before the page is blocked with an advertisement that must be consumed before the user can continue viewing the underlying page content, but instead is intended to increase the chances that a user is engaged in active reading or viewing of a portion of a page before supplementing a portion of the page with relatively unobtrusive overlay content.

Figure 1B:
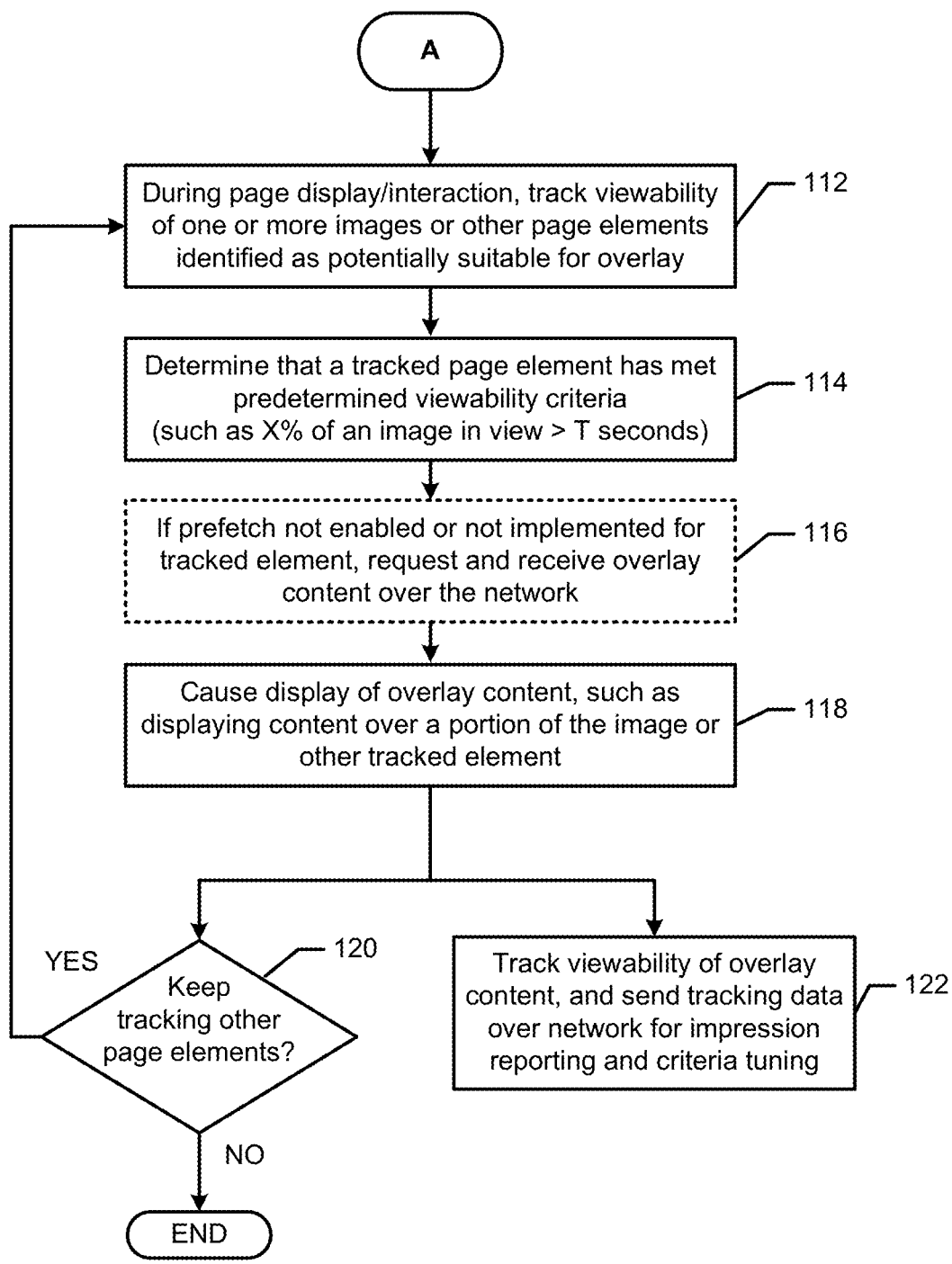

FIGS. 1A and 1B are flow diagrams of an illustrative method 100 for tracking viewability of individual images, videos or other elements within a webpage or user interface (such as a user interface presented for display by an application operating on a user's computing device) as a user browses the content, and displaying associated overlay content when viewability criteria is met. The illustrative method may be implemented by a client computing system, such as client computing system 303 that will be described below, based on code and advertisement content (or other overlay content) received from an advertisement service's server, such as computing system 302 that will be described below.

The illustrative method 100 begins at block 102, where the client device loads a publisher's page and executes code included within the page. The code of the page may include code, such as JavaScript, that is configured to scan page content upon page load to identify images, videos or other page elements within the page that may be suitable for augmenting with advertisement or other dynamically determined overlay content. For example, a JavaScript tag may have been included in the page code by a publisher of the page at the direction of an operator of an advertisement service. In some embodiments, the tag may be placed directly in a webpage's HTML, such as in the footer of the HTML. In other embodiments, the JavaScript may be loaded through a publisher's ad server. When a client device's browser loads the page, the JavaScript or other code placed within the HTML or other page code may cause the browser to request additional code from a server or other computing system operated by an advertisement service (such as computing system 302, that will be described below).

Next, at block 104, the code of the page (or code received from a server subsequent to the initial page load as a result of executing the initial code) causes the browser to locate one or more images (or videos or other page elements or media items, depending on the embodiment) within the page. The code may, for example, search the page for images or other media items that are potentially suitable for placing an advertisement over or within. In other embodiments, the code may be configured to search for page elements other than discrete media items, such as a <div> tag or <iframe> tag in HTML of the page. As an example with respect to considering an image in one embodiment, the code may consider the size of the image, name of the image, metadata associated with the image, and/or contextual information determined from the surrounding text of the page. In some embodiments, the client-side code may perform an initial cursory consideration of an image's suitability for advertisement placement, with a more in-depth analysis subsequently performed by a server.

An image may be identified as appropriate for advertisement placement or other content overlay based in part on a determination that the image is within a certain size range (e.g., being within a certain aspect ratio range, and having dimensions between a predetermined minimum and maximum size). Whether an image is suitable for content overlay (either as an advertisement or for another purpose) may be further or alternatively based on a variety of considerations, depending on the embodiment. Factors or steps in the analysis may include, but are not limited to, one or more of: contextual page analysis, keyword analysis, image naming conventions, image metadata analysis, image recognition (e.g., identifying that a certain real-world object is depicted in a photograph, identifying a company logo within the image, determining that an image meets safety criteria for lack of nudity, etc.), licensing information (e.g., determining that the image has been licensed for advertisement placement), machine learning, and/or other considerations or methods.

In some embodiments, the analysis at block 104 may be performed entirely by the client computing device by executing code received over a network in association with the page. In other embodiments, block 104 may represent a multi-step or iterative process that includes sending results of initial code execution to a server, which then sends back either additional code to be executed to determine if page elements are suitable for content overlay, or that provides an indication of which given page elements are suitable for content overlay based on page metadata provided to the server by execution of the initial code.

At decision block 106, which may only be implemented in certain embodiments, the client computing system may determine whether a prefetch process for downloading or retrieving overlay content over a network is enabled. For example, in one embodiment, an advertisement service may allow a page's publisher to indicate whether prefetching should be enabled for that publisher's pages. In another embodiment, code associated with an advertisement service may dynamically determine whether prefetching of overlay content should occur based on information regarding the client computing system, network conditions, or other factors. If the network prefetch option is enabled in the given embodiment and for the given instance, the method proceeds to block 108, otherwise the method proceeds to block 112 described with respect to FIG. 1B below. In other embodiments than that illustrated in FIGS. 1A and 1B, the optional prefetch process may occur at a later point, such as when predetermined viewability criteria has been partially satisfied (discussed further below with respect to block 114 of FIG. 1B).

At block 108, the client computing system initiates a network prefetch process by sending a request over a network, such as the Internet, for overlay content associated with one or more page elements (e.g., images or videos) that were identified as potentially suitable for content overlay at block 104 above. For example, in one embodiment, JavaScript or other code provided in association with the page may cause the client computing device to preload advertisement content for a certain number of images or other page elements (e.g., the first N images on the page, such as the first two images in one embodiment) that were identified as potentially suitable for presenting advertisements thereon.

For example, at block 108, code may cause a browser operating on the client computing system to send information regarding one or more of the located images (e.g., potentially suitable images for advertisement placement), videos or other objects or elements on the page to a server, such as a server operated by an advertisement service that handles advertisements for a potentially large number of different advertisers. The sent information may include information regarding the page content, the publisher, and each image (and/or video or other media item considered an object of interest in a given embodiment) identified on the page as potentially suitable for advertisement placement or other content overlay. The data sent with respect to each image may include, for example, image metadata, image dimensions, image name, the location of the image in the page, and/or other information.

Once the server selects an advertisement or other overlay content to associate with an image on the page, the server may retrieve or assemble a package that includes one or more media assets (such as images, video data and/or other visual media assets), along with additional code that can be executed at the client device and which causes the client device (in combination with code previously delivered to the client device) to present the advertisement and/or other overlay content for display. In one embodiment, the package may include, for example, HTML, JavaScript, JavaScript Object Notation ("JSON"), and image assets that can be assembled by the client device according to code in the package (e.g., according to the HTML, JavaScript and JSON portions of the package) for display over an image or other page element. The package may include (such as in a JSON portion of the package) advertisement tracking data (including, for example, tracking pixels, which are known in the art), as well as information regarding a URI to be requested if the advertisement is "clicked" or otherwise selected by a user. In some embodiments, the package may include additional information, such as video or animation data, sound files, and/or links to additional third-party hosted content for incorporation into an overlay content display. Overlay content packages are described further in co-pending U.S. patent application Ser. No. 15/951,762, filed Apr. 12, 2018 and entitled "MAINTAINING PAGE INTERACTION FUNCTIONALITY WITH OVERLAY CONTENT," which is hereby incorporated by reference in its entirety herein.

At block 110, the client device receives the overlay content package (which may be considered an advertisement package, in some embodiments) from the server, including the additional code that, when executed, will cause the client device (e.g., via a browser or other application operating on the client device) to display overlay content in association with the particular designated image on the page. However, when the overlay content is retrieved as part of a prefetch process, the code is not executed at the time it is received, but is instead stored in local cache memory for retrieval and execution later (such as at block 118 described below), if at all (e.g., the overlay content may be downloaded but never displayed if viewability criteria described below is never met).

FIG. 1B is a flow diagram continuing the illustrative method 100 discussed above with respect to FIG. 1A. The flow diagram of FIG. 1B begins at block 112, which may be performed after block 110 discussed above with respect to FIG. 1A (or after decision block 106 in instances or embodiments in which prefetch was not enabled). At block 112, the client computing system tracks viewability of one or more images or other page elements that were identified at block 104 as potentially suitable for overlay content (e.g., having an advertisement presented over or within the image). While viewability tracking is illustrated as a single block in the illustrative method 100, it will be appreciated that code may cause the client computing system to continuously track which page elements are in view (including running associated timers) throughout display of the page, including prior to and in parallel with the prefetch process described above.

There are a variety of methods for tracking whether a given page element is in view, and what percentage of the element is in view. Some existing viewability tracking methods are designed to track viewability of advertisements specifically, such as by tracking frame rates of Flash objects that display an advertisement, and are not practical for tracking the viewability of native page elements prior to loading advertisements or adding advertisement-related objects to the page. In some embodiments, determining how much of a given page element (such as an image) is in view may include determining distances in pixels between the current display positions of edges of the page element (top, bottom, left and/or right) relative to edges of the viewport. For example, given the width and height of the viewport, the client computing system can determine the amount or percentage of a given page element that is in view based on that element's position and its display width and height.

As an example according to one embodiment, if the viewport is considered to have a (0, 0) pixel value at the top left of the viewport, an image on the page may be determined to be fully (100%) in view if the display coordinates of the image's top left corner and bottom right corner each have (a) a y-value that is between zero and the viewport height and (b) an x-value that is between zero and the viewport width. For images that are partially in view, the percentage of the image that is in view can be determined in a similar manner. For example, a 200×200 pixel image that only has a top portion visible may be determined to be 50% in view if its top has a display position with a y-value between zero and the height of the viewport, but the distance between the top of the image and the bottom of the viewport (where the bottommost y-value of the viewport may be determined to be the viewport height) is only half of the image height (e.g., 100 pixels).

Once an individual image or other page element is determined to meet the minimum viewability percentage threshold in the given embodiment (which may be 100% in view, in one embodiment), code may automatically initiate a timer to track the amount of time that the given element continues to meet the minimum viewability percentage threshold. The code may repeatedly perform the viewability determination for the element, and may pause or cancel the timer (depending on the embodiment) if at any point the percentage of the element that is in view drops below the minimum viewability percentage threshold. Various optimizations may be applied with respect to these repeated viewability checks in order to minimize processor load. For example, in one embodiment, the code may establish listeners for scrolling events and/or other events that could cause a change in the viewability of a specific page element, and may only perform a new viewability check when triggered by a scroll event or other event. In some such embodiments, the code may apply throttling to decrease the frequency of performing the viewability checks while a user is scrolling.

At block 114, the client computing system may determine that a tracked element on the page has met predetermined viewability criteria that must be met prior to displaying overlay content with respect to that element in the given embodiment. For example, the viewability criteria may be that a certain percentage of the image (e.g., a viewability percentage threshold) is in view for a certain amount of time. In one embodiment, the viewability criteria may indicate that 100% of an image must be in view for at least one second before displaying overlay content over the image. In another embodiment, the viewability criteria may indicate that greater than 50% of an image must be in view for at least 1.5 seconds before displaying overlay content over the image. In some embodiments other than that illustrated in FIGS. 1A and 1B, the client computing system may implement a prefetch process during viewability tracking (rather than when a suitable page element is first identified, as was described above). For example, code may configure the client computing system to implement a prefetch process for overlay content associated with a given page element when that element's viewability criteria is partially satisfied (such as having met a viewability percentage threshold, but before the viewability criteria's time duration has elapsed).

In other embodiments, a viewability score may be repeatedly determined and updated for an element during tracking of the element, and the viewability criteria may establish a minimum viewability score that must be met. For example, in calculating a viewability score, the amount of accumulated time that the element has been in full view may be weighted greater than the amount of accumulated time that the element has been in partial view. As another example, time during which a user was scrolling may receive a lower weight even if the element was in full view throughout the scrolling. As another example, elements that are in full view at a point when a user stops scrolling may receive a large score increase, because the pause in scrolling is likely to correlate with the user reaching a point in the page where the user plans to read or otherwise engage with the page content.

Once a given image or other element of the page is determined to have met the viewability criteria at block 114, the method proceeds to load the overlay content for display in association with the given element, at block 116. If the associated overlay content was previously prefetched, the overlay content (such as an overlay content package that includes code) may be loaded from local cache memory. Otherwise, if overlay content has not yet been received by the client computing system, the client computing system may request or retrieve the overlay content over a network, as discussed above with respect to blocks 108 and 110.

At block 118, the client computing system may cause display of an advertisement or other overlay content over a portion of an image, video, page portion (such as may be identified by a <div> tag in HTML of the page) or other element of the page. Block 118 may include executing additional code in a received data package (in combination with execution of code previously resident on the page and/or previously delivered by the server, in some embodiments). In the case of an image as the underlying page element, executing the code may cause the client device to place a container or drawing canvas over the image or a portion of the image within the page. The code may then cause the client device to render the HTML content of the overlay content package (potentially including executing other embedded or associated code) within the newly created container.

The client device may present image or video data from the overlay content package for display within the container, such that an overlay image or video appears to be on top of the underlying page image or within the underlying page image. While examples of overlay content that appears as a banner or rectangle over a bottom portion of an image are discussed below with respect to FIG. 2C, many other forms of overlay content may be displayed in certain embodiments. More details regarding displaying overlay content and handling user interaction with overlay content, including for overlay content that "frames" an underlying page image rather than appearing over only a single continuous portion of the image, is described in co-pending U.S. patent application Ser. No. 15/951,762, incorporated by reference above.

Once the overlay content is displayed with respect to at least one page element, the illustrative method proceeds to blocks 120 and 122, which are shown in parallel but could occur in any order. Decision block 120 represents that the code associated with the page may still be tracking other elements of the page that may be suitable for displaying additional overlay content. If that is the case, viewability timers and other tracking information will continue for those additional elements as discussed above with respect to block 112.

At block 122, the client computing system may track viewability of the displayed overlay content, and send tracking data over the network (such as to an advertisement service or server) for impression tracking. For example, whether an advertisement presented as overlay content should be counted as a viewable impression may be determined based on whether viewability of the advertisement meets the MRC standard discussed above or other relevant standard. In some embodiments, overlay content tracking data received for a number of different client computing systems may also be subsequently used by the advertisement service to optimize the viewability criteria for displaying overlay content in the future (such as by increasing or decreasing the time delay before overlay content is displayed), either across websites or for a specific publisher's webpages.

While reference is often made above to a "page" and a "browser," it will be appreciated that the disclosure herein is also applicable to contexts other than webpages and web browsers. For example, various other applications, such as applications executable on a mobile device, may present various user interfaces that include native images or video content on which overlay content as described herein may be presented. Various applications are configured to process HTML, including email clients and social media applications, such that only minor modifications, if any, enable the above methods to be implemented in a variety of contexts other than a browser.

Figure 2A:
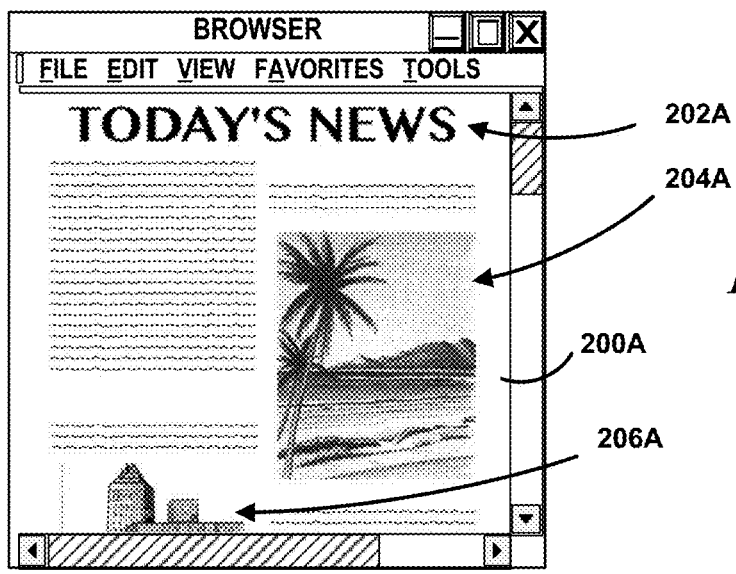
FIGS. 2A, 2B and 2C illustrate a displayed page at three different points in time during user viewing of the page, which includes overlay content that is displayed over an underlying page image only after viewability criteria has been met with respect to the given image.
Figure 2B:
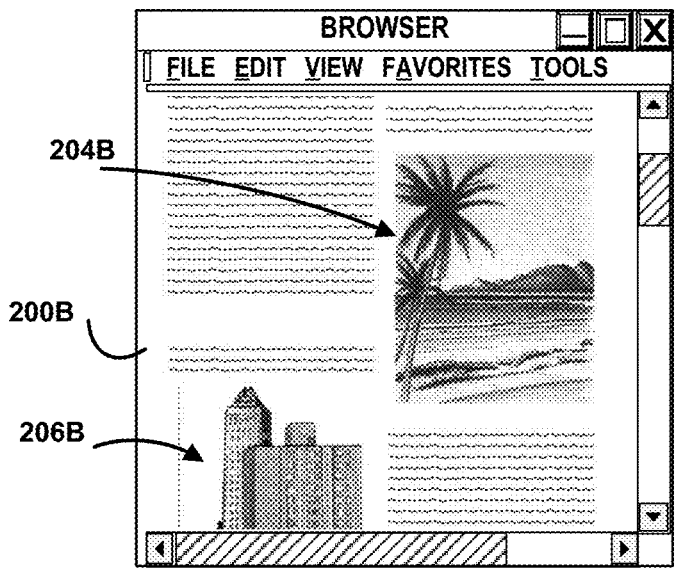
Figure 2C:
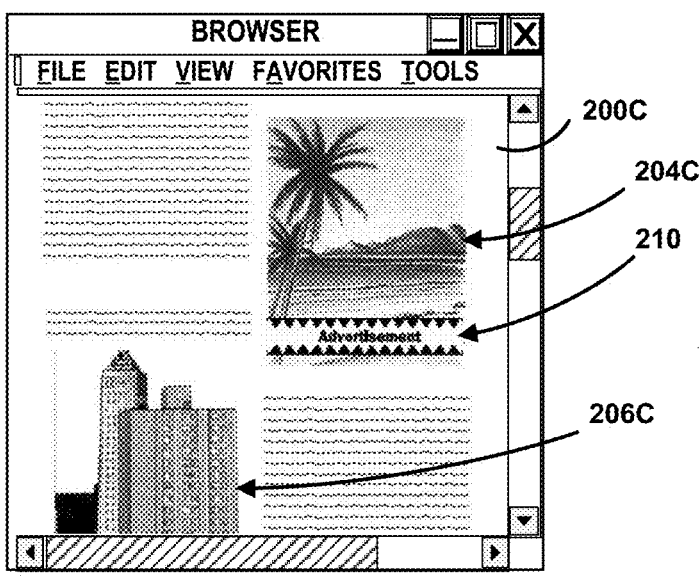

FIGS. 2A, 2B and 2C illustrate a displayed page (as 200A, 200B and 200C, respectively) at three different points in time during user viewing of the page, which includes overlay content that is displayed over an underlying page image only after viewability criteria has been met with respect to the given image. In each of FIGS. 2A, 2B and 2C, the page is displayed in a browser window. The page includes lines of text (represented in the figures as lines), as well as images. As will be appreciated, a page may contain many other types of content.

FIG. 2A may represent the page 200A at the time it is first displayed on a client computing system, such as client computing system 303 described below. The page includes a first image 202A (including rendered text within the image that reads "Today's News"), a second image 204A, and a third image 206A. Each of images 202A, 204A and 206A may be considered a different element of page 200A. These three images, as well as others on the page that are not in view, may be identified by code of the page upon initial page load, as discussed above with respect to blocks 102 and 104 of FIG. 1A.

In one embodiment, the code may determine that image 202A is not suitable for presenting overlay content thereon (such as based on its size, position on the page, and/or content), but that images 204A and 206A are potentially suitable to be augmented with the display of overlay content. Accordingly, code of the page may cause the browser to begin tracking viewability of images 204A and 206A according to methods described above. As a result of the initial viewability check for these images, the code may determine that at the initial display time of FIG. 2A, image 204A is 100% in view, while image 206A is only 20% in view. In an embodiment in which the minimum viewability percentage threshold is set at 50%, a timer may thus be started for image 204A (in order to determine whether the image 204A remains at least 50% in view for a threshold amount of time), but no timer may be started for image 206A at this point (because its percentage in view falls below the minimum viewability percentage threshold).

Page view 200B of FIG. 2B may represent the same page as 200A above, but 0.75 seconds later in time. As illustrated, the user may have scrolled down slightly within the page, causing all of the page content to shift upwards within the browser window. Because image 204B is still 100% in view at the time of FIG. 2B, a timer tracking the amount of time that image 204B has met the minimum viewability percentage threshold may be at 0.75 seconds as of the time of FIG. 2B. Image 206B may have just reached 50% in view as a result of a scrolling action at the time of FIG. 2B, and thus a timer may be started at this point for image 206B. However, because no image has yet met the overall viewability criteria (which may be set as at least 50% of the image in view for at least one second, in the given example embodiment), no overlay content has yet been displayed in FIG. 2B.

Page view 200C of FIG. 2C may represent the same page as 200A and 200B above, but may be another 0.75 seconds later in time than FIG. 2B (and thus 1.5 seconds later in time than FIG. 2A). As illustrated, overlay content 210 in the form of an advertisement has been added over a portion image 204C. The overlay content may have been presented for display because the viewability criteria was met for image 204C (e.g., more than 50% of the image was in view for more than one second). As will be appreciated by one of ordinary skill in the art, the overlay content 210 may be selectable by a user to navigate to a landing page associated with the advertisement, and the advertisement may move with the image as the user continues to scroll through the page. In some embodiments, the viewability of image 206C may continue to be tracked to determine whether different overlay content should be displayed over image 206C. In other embodiments, code associated with the page may configure the client computing system to limit the number of images on which overlay content will be displayed on a given page or for page elements in close proximity to each other.

While in-image advertisements are described above as examples, it will be appreciated that aspects of the disclosure provide improvements for many other types of overlay content. For example, overlay content as described herein may be presented over video content, Flash objects, a portion of a page itself, or other content of a webpage or user interface besides a static image. In one embodiment, overlay content that is bound to a portion of a page itself rather than to a single media object may be configured to visually collapse or minimize after a predetermined time (such as five seconds), or in response to a user request to hide the overlay content.

Figure 3:
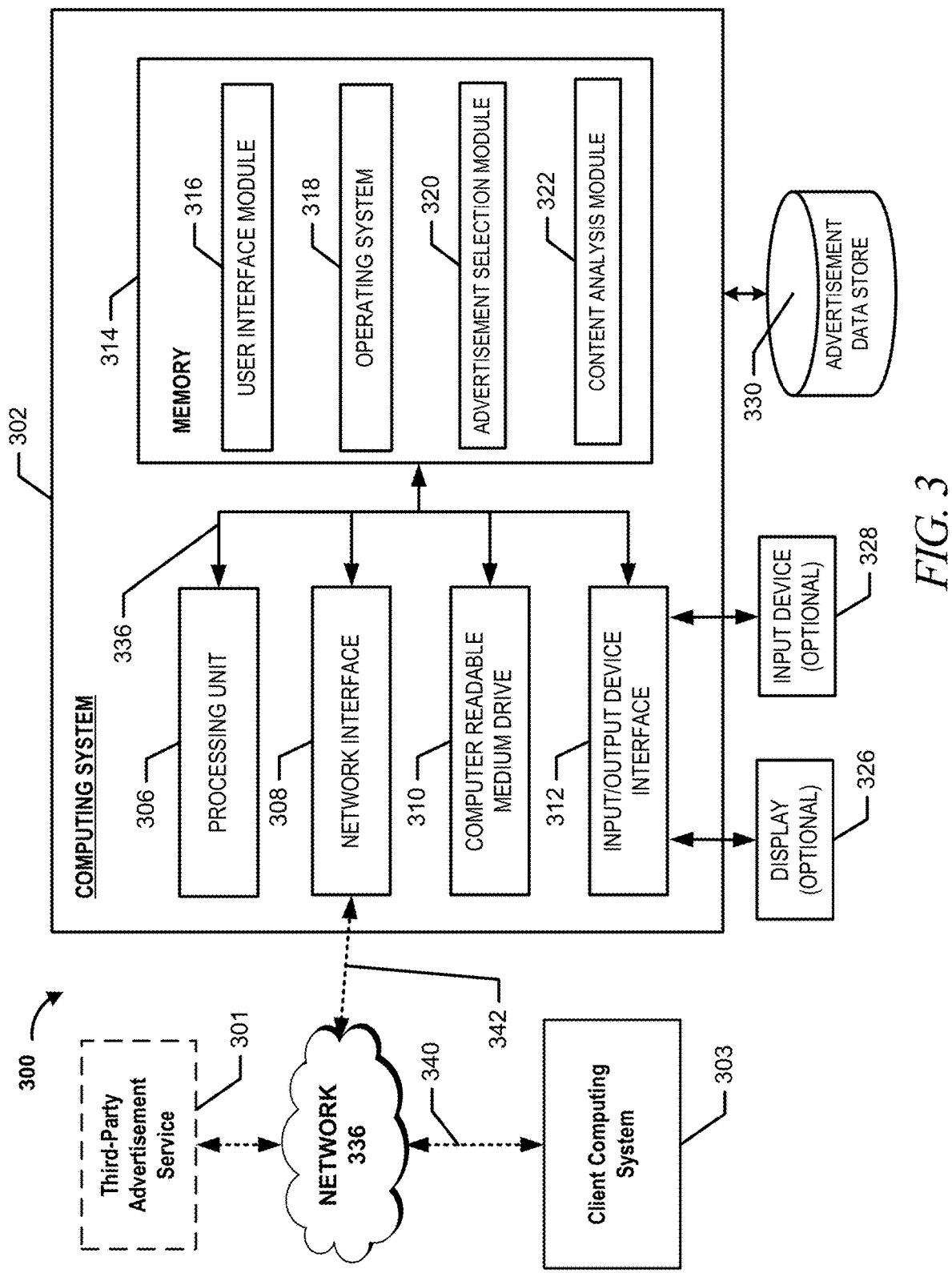
FIG. 3 is a system block diagram of a computing environment suitable for use in various embodiments of the present disclosure.

FIG. 3 illustrates a general architecture of a computing environment 300, according to some embodiments. As depicted in FIG. 3, the computing environment 300 may include a computing system 302. The general architecture of the computing system 302 may include an arrangement of computer hardware and software components used to implement aspects of the present disclosure. The computing system 302 may include many more (or fewer) elements than those shown in FIG. 3. It is not necessary, however, that all of these generally conventional elements be shown in order to provide an enabling disclosure. In some embodiments, the computing system 302 may be an example of what is referred to as the server or advertisement service's system above.

As illustrated, the computing system 302 includes a processing unit 306, a network interface 308, a computer readable medium drive 310, an input/output device interface 312, an optional display 326, and an optional input device 328, all of which may communicate with one another by way of a communication bus 336. The processing unit 306 may communicate to and from memory 314 and may provide output information for the optional display 326 via the input/output device interface 312. The input/output device interface 312 may also accept input from the optional input device 328, such as a keyboard, mouse, digital pen, microphone, touch screen, gesture recognition system, voice recognition system, or other input device known in the art.

The memory 314 may contain computer program instructions (grouped as modules or components in some embodiments) that the processing unit 306 may execute in order to implement one or more embodiments described herein. The memory 314 may generally include RAM, ROM and/or other persistent, auxiliary or non-transitory computer-readable media. The memory 314 may store an operating system 318 that provides computer program instructions for use by the processing unit 306 in the general administration and operation of the computing system 302. The memory 314 may further include computer program instructions and other information for implementing aspects of the present disclosure. For example, in one embodiment, the memory 314 may include a user interface module 316 that generates user interfaces (and/or instructions therefor) for display upon a computing system, e.g., via a navigation interface such as a browser or application installed on the computing system 302 or the client computing system 303.

In some embodiments, the memory 314 may include an advertisement selection module 320 and content analysis module 322, which may be executed by the processing unit 306 to perform operations according to various embodiments described herein. The modules 320 and/or 322 may access the data store 330 in order to retrieve data described above and/or store data. The data store may be part of the computing system 302, remote from the computing system 302, and/or may be a network-based service. The advertisement data store 330 may store various advertisement or other overlay content and information, such as images, video, text, associated rules for when to display given overlay content, bid information, keyword information, code packages that instruct a browser or application how to display given overlay content, and/or other data or content.

In some embodiments, the network interface 308 may provide connectivity to one or more networks or computing systems, and the processing unit 306 may receive information and instructions from other computing systems or services via one or more networks. In the example illustrated in FIG. 3, the network interface 308 may be in communication with a client computing system 303 via the network 336, such as the Internet. In particular, the computing system 302 may establish a communication link 342 with a network 336 (e.g., using known protocols) in order to send communications to the computing system 303 over the network 336. Similarly, the computing system 303 may send communications to the computing system 302 over the network 336 via a wired or wireless communication link 340. In some embodiments, the computing system 302 may additionally communicate via the network 336 with an optional third-party advertisement service 301, which may be used by the computing system 302 to retrieve advertisement data to be delivered to a client computing system 303. Depending on the embodiment, the computing system 302 may be configured to retrieve advertisement data from either advertisement data store 330 or third-party advertisement service 301 depending on various information, such as publisher page information, image information, advertiser preference, comparison of bid information, and/or other factors.

Those skilled in the art will recognize that the computing systems 302 and 303 may be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like. The client computing system 303 may include similar hardware to that illustrated as being included in computing system 302, such as a display, processing unit, network interface, memory, operating system, etc. In some embodiments, the client computing system 303 may perform a number of features described above (such as displaying a page, tracking page elements' viewability, supplementing display of the page with overlay content, etc.) based in part on a browser or other application operating on the client computing system 303 executing code received over the network from the computing system 302 and/or other network-accessible server or service.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   a processor in communication with the memory and configured with processor-executable instructions to perform operations comprising:
      receiving a page for display, wherein the page includes page content for display and a reference to a page image, wherein the page image comprises an image file to be displayed in association with the page content;
      causing initial display of at least a portion of the page;
      executing code associated with the page, wherein the code causes the processor to at least:
         determine that the page image is suitable for the computer system to present overlay content over at least a portion of the page image;
         determine that at least a predetermined minimum percentage of the page image is visible within the initial display of the at least a portion of the page;
         start a timer that tracks an amount of time that the at least a predetermined minimum percentage of the page image remains visible during user interaction with the page;
         generate a viewability score associated with the page image based at least in part on the amount of time that the at least a predetermined minimum percentage of the page image remains visible, wherein generating the viewability score includes applying a lower weight to a first portion of time during which a scrolling action is being applied to the page than to a second portion of time during which no scrolling action is being applied to the page; and
         based at least in part on a determination that the viewability score meets a threshold, cause display of the overlay content over the at least a portion of the page image.

2. The computer system of claim 1, wherein the predetermined minimum percentage of the page image is one hundred percent of the page image.

3. The computer system of claim 1, wherein the viewability score is based at least in further part on additional user interaction data other than scrolling actions.

4. The computer system of claim 1, wherein the overlay content is displayed over the at least a portion of the page image based in further part on detection of a pause in scrolling action associated with display of portions of the page.

5. The computer system of claim 1, wherein the overlay content as displayed covers only a portion of the page image and does not cover any portion of the page other than the page image.

6. The computer system of claim 1, wherein the code causes the processor to determine that the predetermined minimum percentage of the page image is visible based at least in part on a distance between a current display position of at least one edge of the page image relative to at least one edge of a viewport in which the page is displayed.

7. A computer-implemented method comprising:
receiving a page for display;
causing initial display of at least a portion of the page;
identifying a page element of the page that is suitable for presenting an advertisement over at least a portion of the page element;
determining that at least a predetermined minimum percentage or amount of the page element is visible within the initial display of the at least a portion of the page;
tracking an amount of time that the predetermined minimum percentage or amount of the page element remains visible during page display;
generating a viewability score associated with the page element based at least in part on the amount of time that the predetermined minimum percentage or amount of the page element remains visible, wherein generating the viewability score includes applying a lower weight to a first portion of time during which a scrolling action is being applied to the page than to a second portion of time during which no scrolling action is being applied to the page; and
based at least in part on a determination that the viewability score meets a threshold, causing display of advertisement content over the at least a portion of the page element.

8. The computer-implemented method of claim 7, wherein the page element comprises an image, and wherein the advertisement content is displayed as overlay content covering a portion of the image.

9. The computer-implemented method of claim 7, wherein the page element comprises a video or an object within the page.

10. The computer-implemented method of claim 7, wherein the page element comprises a portion of the page defined by a specific markup language tag.

11. The computer-implemented method of claim 7 further comprising:
determining whether the display of the advertisement content over the at least a portion of the page element meets viewable impression criteria; and
based on whether the viewable impression criteria is met, adjusting a threshold amount of time before advertisements are displayed for subsequent viewings of the page by one or more users.

12. The computer-implemented method of claim 7 further comprising initiating a prefetch process to obtain the advertisement content over a network prior to the determination that the viewability score meets the threshold.

13. The computer-implemented method of claim 7 further comprising simultaneously tracking, for each individual page element of a plurality of page elements within the page, an amount of time that a predetermined minimum percentage or amount of the individual page element is visible during page display, wherein the plurality of page elements are each identified by execution of code associated with the page to be suitable for display of an advertisement thereon, and wherein the initial display of the page does not include display of any advertisement associated with any of the plurality of page elements.

14. A non-transitory computer readable medium storing computer executable instructions that, when executed by one or more computer systems, configure the one or more computer systems to perform operations comprising:
identifying a page element of a page that is suitable for presenting an advertisement over at least a portion of the page element, wherein the page element does not include a displayed advertisement at a time of an initial display of the page;
determining that at least a predetermined minimum percentage or amount of the page element is visible during display of at least a portion of the page;
tracking an amount of time that the predetermined minimum percentage or amount of the page element remains visible during page display;
generating a viewability score associated with the page element based at least in part on the amount of time that the predetermined minimum percentage or amount of the page element remains visible, wherein generating the viewability score includes applying a lower weight to a first portion of time during which a scrolling action is being applied to the page than to a second portion of time during which no scrolling action is being applied to the page; and
based at least in part on a determination that the viewability score meets a threshold, causing display of advertisement content over the at least a portion of the page element.

15. The non-transitory computer readable medium of claim 14, wherein the page is a webpage, and wherein the page element is identified based at least in part on one or more markup tags of the webpage.

16. The non-transitory computer readable medium of claim 14, wherein the operations further comprise repeatedly determining updated viewability scores for the page element during display of the page.

17. The non-transitory computer readable medium of claim 16, wherein the viewability score is determined based at least in part by applying (a) a first weight to an amount of time that the entire page element has been visible during page display and (b) a second weight to an amount of time that a portion less than the entire page element has been visible during page display, wherein the first weight is greater than the second weight.

18. The non-transitory computer readable medium of claim 16, wherein determining the viewability score includes applying a score increase at a point in time that a user stops scrolling the page based on a determination that the page element is in view at the point in time that the user stops scrolling the page.

* * * * *